May 24, 1932.  E. M. MAY  1,859,834

SHUT-OFF VALVE

Filed Jan. 16, 1929   2 Sheets-Sheet 1

INVENTOR
Edward M. May
BY Evans & McCoy
ATTORNEYS

May 24, 1932.  E. M. MAY  1,859,834
SHUT-OFF VALVE
Filed Jan. 16, 1929   2 Sheets-Sheet 2

INVENTOR
Edward M. May
BY Evans & McCoy
ATTORNEYS

Patented May 24, 1932

1,859,834

UNITED STATES PATENT OFFICE

EDWARD M. MAY, OF DETROIT, MICHIGAN, ASSIGNOR TO GLEN P. COWAN, OF DETROIT, MICHIGAN

SHUT-OFF VALVE

Application filed January 16, 1929. Serial No. 332,845.

The present invention relates to valves for liquid and gas lines and while applicable to valves of various types employed in liquid and gas lines, it is particularly applicable to valves in refrigerating systems where considerable difficulty is encountered in maintaining a fluid tight seal between the movable actuating part of the valve and wall of the valve casing through which it projects.

The present invention has for its object the elimination of the use of packing between the valve stem and casing and to provide a perfectly fluid tight seal which is not affected by the fluid in the line and which will remain fluid tight under extreme temperature and pressure conditions.

A further object is to provide a valve which is of simple construction, which is inexpensive to manfacture and which is easy to operate.

With the above and other objects in view, the invention may be said to comprise the device as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which.

Figure 2:
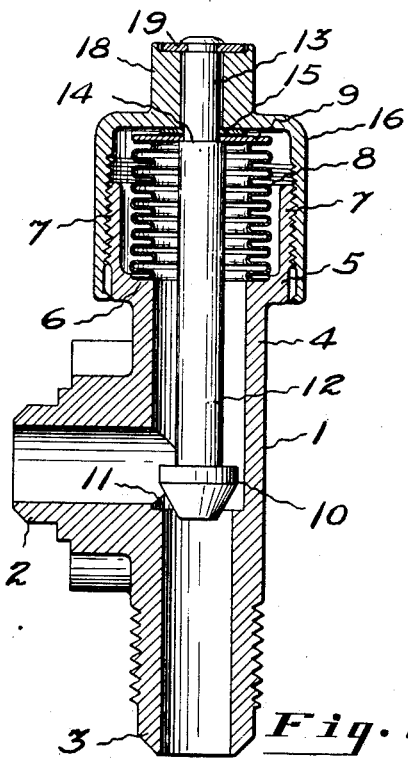
Fig. 2 is a section taken on the line indicated at 2—2 in Fig. 1.
Figure 1:
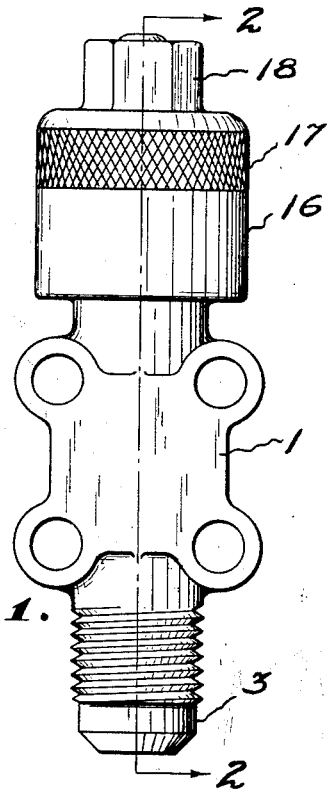
Figure 1 is a side elevation of a valve embodying the invention.

As shown in Figs. 1 and 2 of the drawings, the valve casing 1 has an extension 2 adapted to be coupled to a fluid line and an extension 3 at right angles to the extension 2 which is adapted to be coupled to a branch line. Directly opposite the extension 3, and in alinement therewith, the casing has an extension 4 terminating in an enlarged externally threaded cup portion 5 provided with an internal shoulder 6. A tubular bellows 8 has its inner end secured to the shoulder 6 by suitable means to insure a fluid tight seal between the inner end of the bellows and the casing. The inside of the bellows 8 opens into the interior of the valve casing. A head 9 provides a fluid tight closure for the outer end of the bellows.

A valve 10 is mounted in the casing for movement into and out of engagement with a valve seat 11 to close or open the passage through the extension 3. The valve 10 has a stem 12 which extends axially through the extension 4, the bellows 8, and the head 9 of the bellows with which it has fluid tight connection.

A cup-shaped cap 16, of sufficient size to house the bellows 8, is rotatably mounted on the reduced upper end 13 of the valve stem. A suitable shoulder 14 is formed on the valve stem at the base of the reduced portion 13 for engaging the under side of the head 9 to take stresses imposed on the valve stem by the cap 16. A washer 15 may be interposed between the head 9 and the cap 16 which is internally threaded and adapted to screw onto the threaded portion 4 of the casing. At its outer end the cap 16 is provided with a central hexagonal projection 18 by means of which the cap may be adjusted. The cap also has an axial bore through this projection which is of a diameter to fit loosely upon the reduced end portion 13 of the valve stem. A retaining washer 19 is secured to the outer end of the valve stem and bears against the outer end of the projection 18. The cap 16 is thus rotatably mounted on the valve stem and is in threaded engagement with the flange of the casing so that when the cap is rotated it will be moved outwardly or inwardly with respect to the casing and the valve 10 and the head 9 of the bellows will be moved with the cap in a direction toward or away from the valve seat 11. By turning the cap 16 in one direction the bellows 8 will be collapsed and the valve 10 will be moved into engagement with the seat 11, and by rotating the cap 16 in the opposite direction the bellows 8 will be extended and the valves 10 will be moved away from the seat 11. The cap 16 is of a size such that it can be conveniently gripped with the hand to turn it to the right or left to open or close the valve, the outer surface of the cap being preferably provided with a knurled peripheral portion 17 to permit a firm grip to be had on the cap. In some instances it may be preferable to adjust the valve by means of a wrench. The hexagonal projection 18 provides a nut portion for receivng a wrench to turn the cap to open or close the valve, or to adjust the same to any desired position in the casing.

Figure 4:
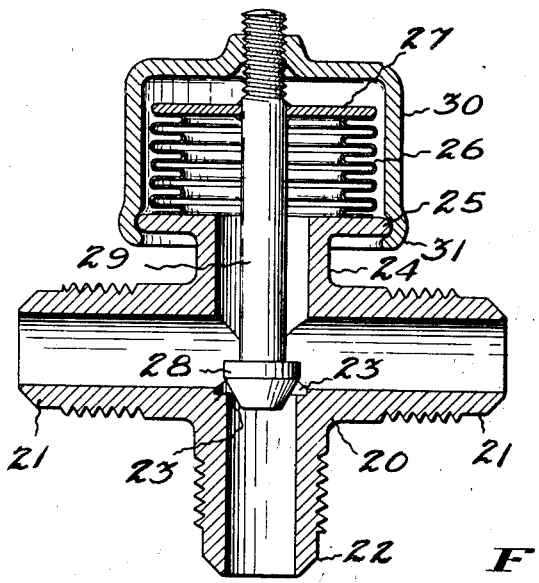
Fig. 4 is a section taken on the line indicated at 4—4 in Fig. 3.
Figure 3:
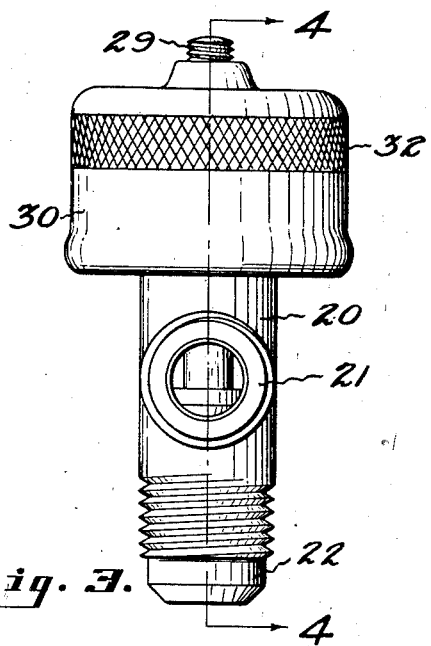
Fig. 3 is a side elevation showing a modification of the invention.

In Figs. 3 and 4 of the drawings, there is shown a modified construction in which the valve casing 20 is adapted to be mounted between the ends of a fluid pressure line, the casing 20 being provided with axially alined extensions 21 whch are adapted to be coupled to adjoining sections of a pressure line. The casing 20 is also provided with a lateral projection 22 at right angles to the projections 21 and at the inner end of the passage tnrough the extension 22 there is provided a valve seat 23.

Directly opposite the extension 22, there is an extension 24 provided with a laterally extending circumferential flange 25 at its outer end. Upon the outer face of the flange 25, there is secured the inner end of a tubular bellows 26 which is open at its inner end and provided with a head 27 at its outer end. The bellows 26 has a fluid tight connection with the flange 25 and with the head 27 and is in communication with the pressure line through the extension 24. The valve 28, which is mounted for movement into and out of engagement with the seat 23, is provided with a stem 29 which extends through the head 27 of the bellows and which is rigidly secured thereto by welding or other suitable means which will insure a fluid tight connection between the valve stem and the head. The projecting outer end portion of the valve stem 29 is screw threaded to receive a threaded cap 30 which is cup shaped and of a size to form a housing for the bellows 26. The inner edge of the cylindrical wall of the cap 30 is crimped over the outer edge of the flange 25 as indicated at 31 to provide a groove therein in which the flange is loosely received so that the cap 30 is rotatable on the flange 25, but is held against axial movement with respect thereto.

Figure 6:
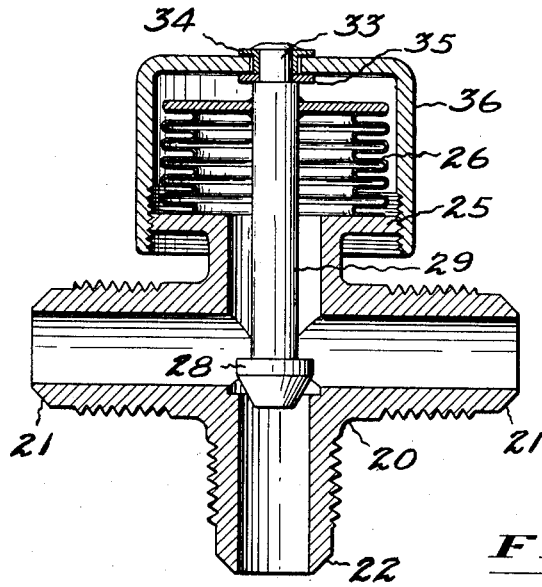
Fig. 6 is a section taken on the line indicated at 6—6 in Fig. 5.
Figure 5:
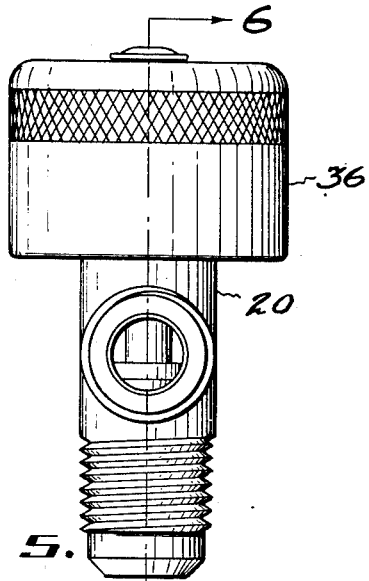
Fig. 5 is a side elevation showing a further modification.

Rotation of the cap 30 will cause the valve 28 and stem 29 to be moved toward or away from the valve seat 23, the movement of the valve stem extending or contracting the bellows 26. To provide a good hand grip on the cap 30, a portion of the periphery 32 is knurled as shown in Fig. 3. By turning the cap 30 in one direction, the valve 28 is advanced toward the seat and by turning the cap 30 in the opposite direction, the valve 28 is moved away from the seat. In Figs. 5 and 6 of the drawing, a slightly modified form of the valve adjusting means is shown applied to a valve casing substantially identical with that shown in Figs. 3 and 4. In this modification, the valve stem 29, instead of having a threaded upper end, is provided with a reduced upper end 33 which may comprise a threaded or other detachable connection to the main body of the valve stem and which retains a flanged sleeve 34, and a washer 35, which provide a bearing for an adjusting cap 36, similar in form to those previously described, permitting the cap to rotate on the valve stem, but preventing the cap from having axial movement with respect to the valve stem. In this modification, the cap 36, instead of having threaded engagement with the valve stem is provided with internal screw threads at its inner end which engage with screw threads formed on the peripheral edge of the flange 25. When rotation is imparted to the cap 36, the cap is moved inwardly toward the valve casing or outwardly therefrom and the valve 28 which is held against axial movement with respect to the cap moves with the cap into or out of engagement with the valve seat.

Figure 8:
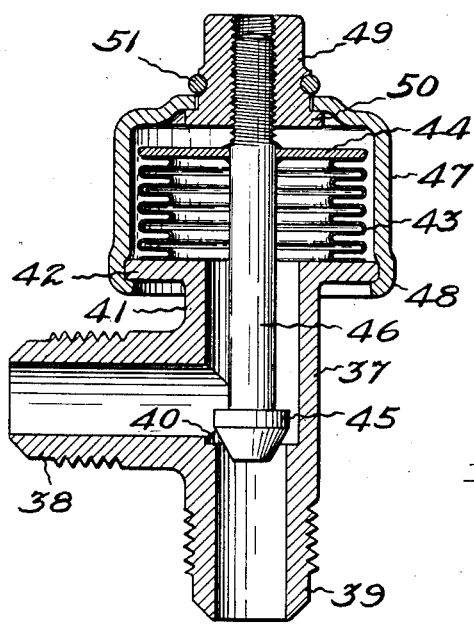
Fig. 8 is a section taken on the line indicated by the line 8—8 in Fig. 7.
Figure 7:
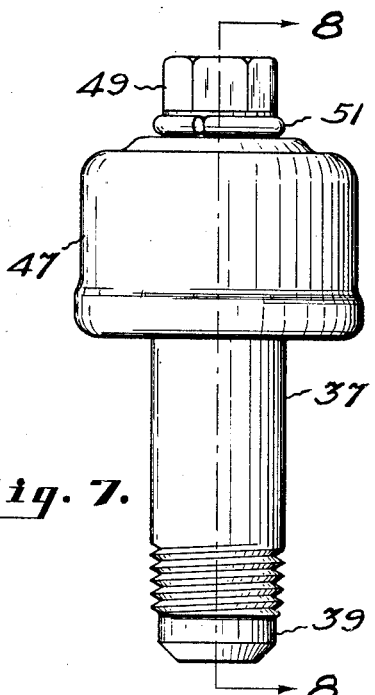
Fig. 7 is a side elevation showing another modification.

In Figs. 7 and 8 of the drawings the valve casing 37 is of substantially T shape having a projection 38 adapted to be secured to the pressure line and an extension 39 adapted to be secured to a branch line. A valve seat 40 being provided at the inner end of the passage through the extension 39 and an extension 41 directly opposite the extension 39 has a flange 42 at its outer end to which is attached the inner end of a bellows 43. The bellows 43 is open at its inner end to the valve casing and is closed at its outer end by a head 44. A valve 45 is mounted for movement into and out of engagement with the seat 40 and has its stem 46 extending through the head 44 and welded or otherwise secured thereto.

In this modification, the bellows 43 is housed within a cup shaped casing member 47 which is secured to the flange 42 at its inner end by crimping its inner edge 48 over the flange. At its outer end, the housing member 47 is provided with a central opening through which the valve stem 46 projects. The projecting portion of the valve stem is screw threaded to receive a nut 49 which is rotatably mounted within the opening of the housing member 47. the inner end of the nut being provided with a flange 50 engaging the interior of the housing member around the opening and with a detachable retaining ring 51 which engages the exterior of the housing member 47. The nut is held against axial movement by the flange 50 and ring 51 so that when the nut is rotated, the valve stem will be caused to travel axially of the nut. By rotating the nut in one direction, the valve 45 may be moved toward its seat and by rotating the nut in the opposite direction, the valve may be removed away from its seat.

In all of the modifications of the invention above described, the only connections which need to be made fluid tight are the connections between the bellows and casing and between the valve stem and head of the bellows and, since both of these connections are rigid and permanent, they may easily be made perfectly fluid tight.

In each of the modifications above described, the valve is positively held in any position in which it may be adjusted and the tubular bellows provides a perfectly tight seal for the valve stem. The ends of the bellows being perfectly connected to the valve casing and to the head and the head being permanently connected to the valve stem, there is no danger of developing a leak even though there be extreme variations in pressure or extreme variations in temperature.

Furthermore, the device of the present invention is quite simple and inexpensive to manufacture. The rotatable cap of a size convenient to provide a hand grip enables the valve to be quickly and easily adjusted manually or, when acting against heavy pressures. the valve may be quickly and easily adjusted by means of a wrench.

Furthermore, it is to be understood that the particular form of apparatus shown and described, and the particular procedure set forth, are rresented for purposes of explanation and illustration and that various modifications of said apparatus and procedure can be made without departing from my invention as defined in the appended claims.

What I claim is:

1. In a device of the character described, a valve casing having a valve seat and a tubular extension opening to the interior of the casing opposite said seat, said extension having a peripheral flange at its outer end, a bellows open at its inner end and having a fluid tight connection to said flange, a head sealing the outer end of said bellows, a valve engageable with said seat and having a stem extending through and rigidly secured to said head, and a nut having a part engaging said flange and a part engaging said stem for adjusting said valve.

2. In a device of the character described, a valve casing having a valve seat and a tubular extension opening to the interior of the casing opposite said seat, said extension having a peripheral flange at its outer end, a bellows open at its inner end and having a fluid tight connection to said flange, a head sealing the outer end of said bellows, a valve engageable with said seat and having a stem extending through and rigidly secured to said head, and a nut in the form of a cap rotatably engaging the stem and flange having a threaded connection with one and held against axial movement with respect to the other.

3. In a device of the character described, a valve casing having a valve seat and a tubular extension opening to the interior of the casing opposite said seat, said extension having a peripheral flange at its outer end, a bellows open at its inner end and having a fluid tight connection to said flange, a head sealing the outer end of said bellows, a valve engageable with said seat and having a stem extending through and rigidly secured to said head, and a cupshaped cap enclosing said bellows, said cap being rotatably mounted on the stem and flange, having a threaded connection with one and held against longitudinal movement with respect to the other.

4. In a device of the character described, a valve casing having a valve seat and a tubular extension opening to the interior of the casing opposite said seat, said extension having a peripheral flange at its outer end, a bellows open at its inner end and having a fluid tight connection to said flange, a head sealing the outer end of said bellows, a valve engageable with said seat and having a stem extending through and rigidly secured to said head, and a cupshaped cap enclosing said bellows, said cap being rotatably mounted on the stem and flange, having a threaded connection with one and held against longitudinal movement with respect to the other, said cap having a knurled exterior surface so that it may be turned by hand to open or close the valve.

5. In a device of the character described, a valve casing having a valve seat and a tubular extension opening to the interior of the casing opposite said seat, said extension having a peripheral flange at its outer end, a bellows open at its inner end and having a fluid tight connection to said flange, a head sealing the outer end of said bellows, a valve engageable with said seat and having a stem extending through and rigidly secured to said head, and a cupshaped cap enclosing said bellows, said cap being rotatably mounted on the stem and flange, having a threaded connection with one and held against longitudinal movement with respect to the other, said cap having a polygonal portion whereby it may be turned by a wrench to open or close the valve.

6. In a device of the character described, a valve casing having a valve seat and a tubular extension opening into the interior of the casing opposite said seat, said extension having an enlarged chamber provided with an internal shoulder at its inner end surrounding the opening, an adjustable cap closing the outer end of said chamber and having threaded engagement with the extension, a tubular bellows in said chamber having an open inner end seated on said shoulder and secured thereto by a fluid tight connection, a head sealing the outer end of said bellows, and a valve engageable with said seat and having a stem extending through said opening, bellows, head and cap, said stem being fixed to said head and held against endwise movement in the cap.

In testimony whereof I affix my signature.

EDWARD M. MAY.